United States Patent [19]

Hibst

[11] Patent Number: 4,680,130

[45] Date of Patent: Jul. 14, 1987

[54] PREPARATION OF FINELY DIVIDED ISOTROPIC FERRITE POWDERS HAVING THE SPINEL STRUCTURE

[75] Inventor: Hartmut Hibst, Ludwigshafen, Fed. Rep. of Germany

[73] Assignee: BASF Aktiengesellschaft, Ludwigshafen, Fed. Rep. of Germany

[21] Appl. No.: 780,458

[22] Filed: Sep. 26, 1985

[51] Int. Cl.$^4$ ............................................. C04B 35/26
[52] U.S. Cl. ................................. 252/62.60; 106/292; 106/301; 106/304; 252/62.62; 252/62.64; 423/594; 423/632
[58] Field of Search .............................. 423/594, 632; 252/62.60–62.64; 106/292, 304, 301

[56] References Cited

U.S. PATENT DOCUMENTS

| | | | |
|---|---|---|---|
| 3,822,210 | 7/1974 | Iwase et al. ...................... | 252/62.56 |
| 4,289,745 | 9/1981 | Patil ................................... | 423/594 |
| 4,292,294 | 9/1981 | Patil et al. ........................ | 423/594 |
| 4,336,242 | 6/1982 | Schmidberger et al. .......... | 423/594 |
| 4,425,250 | 1/1984 | Hibst ................................. | 423/594 |
| 4,473,542 | 9/1984 | David ................................ | 423/594 |
| 4,486,401 | 12/1984 | Arons et al. ..................... | 423/594 |

Primary Examiner—Stephen J. Lechert, Jr.
Attorney, Agent, or Firm—Keil & Weinkauf

[57] ABSTRACT

A process for the preparation of ferrite powders which have a particle fineness which can be set to a defined value, of the general composition $$M(II)_x Fe(II)_{1-x} Fe(III)_2 O_4$$

and $$M(II)_x Fe(III)_{3-x} O_{4.5-0.5x}$$

where M is Mg, Mn, Co, Ni, Cu and/or Zn and x is from 0 to 1, and have an essentially isotropic particle shape.

4 Claims, No Drawings

PREPARATION OF FINELY DIVIDED ISOTROPIC FERRITE POWDERS HAVING THE SPINEL STRUCTURE

The present invention relates to a process for the preparation of finely divided ferrite powders which have the spinel structure, are of the general formulae $$M(II)_xFe(II)_{1-x}Fe(III)_2O_4$$

and $$M(II)_xFe(III)_{3-x}O_{4.5-0.5x}$$

where M is Mg, Mn, Co, Ni, Cu and/or Zn and x is from 0 to 1, and have an essentially isotropic particle shape.

$Fe_3O_4$ pigments or $Zn_xFe_{3-x}O_{4.5-0.5x}$ pigments having a high BET specific surface area which can be set to a defined value are required for dyeing plastics, or other organic binders for the production of colored coatings, in transparent black or orange to yellow hues. If the BET specific surface area of the pigment is too low, the resulting colorations are not transparent but high-hiding. If it is too high, one of the effects is that the dispersibility of the pigments is adversely affected. Furthermore, $Fe_3O_4$ pigments and $Zn_xFe_{3-x}O_4$ pigments having a high BET specific surface area which can be set to a defined value are desirable for the preparation of magnetic liquids. If the BET specific surface area of the magnetic particles is too low, the particles agglomerate and flocculate, the magnetic liquid losing its superparamagnetic property. On the other hand, an extremely high specific surface area of the pigment has an adverse effect on its saturation magnetization and therefore also on the saturation magnetization of the magnetic liquid, since it is known that the non-magnetic part of the pigment surface increases as the pigment becomes more finely divided. Similarly, $\gamma$-$Fe_2O_3$ pigments and $Zn_xFe_{3-x}O_{4.5-0.5x}$ pigments which can be overdyed and have a high, but not extremely high, BET specific surface area which can be set to a defined value are required for the preparation of colored magnetic liquids and inks. Moreover, very dense, magnetically soft polycrystalline MnZn or NiZn ferrite ceramics are required for the preparation of magnetic heads. The head-dependent noise and the permeability of such magnetic heads, eg. hot-pressed magnetic heads, increase as the fineness of the structure decreases. It has also been found that, when the ferrite ceramic is processed to magnetic heads having narrow recording tracks, the mechanical stability of the said ceramic improves as the particle size decreases. For the preparation of the stated fine-particled ferrite ceramics, correspondingly finely divided MnZn or NiZn ferrite pigments having a particle size which can be set to a defined value are therefore required. On the other hand, starting ferrite pigments which are too finely divided cannot be homogeneously compacted during sintering and therefore result in a ferrite ceramic which has an undesirably high porosity.

Ferrite powders which have the spinel structure and are of the general formula $M(II)_xFe(II)_{1-x}Fe(III)_2O_4$, where M is Mg, Mn, Co, Ni, Cu and/or Zn, and $0 \leq x \leq 1$, can be prepared by a wet-chemical route, by two different methods.

In the neutralization process, a coprecipitate having a pH of 11-13 is used as the starting material. It is prepared by combining an aqueous alkali metal hydroxide solution, an M(II) salt solution and an Fe(III) salt solution (where x is 1, the addition of Fe(II) salt solution is dispensed with). The coprecipitate is then heated without passing in an oxidizing gas. Frequently, heating of the coprecipitate is even carried out under a non-oxidizing protective gas, eg. nitrogen or argon. This gives an extremely finely divided ferrite powder which has the composition $M_xFe_{3-x}O_4$ [$=M(II)_xFe(II)_{1-x}Fe(III)_2O_4$], where $0 \leq x \leq 1$, and an isotropic particle shape. In the neutralization process, the ratio of the iron(III) ions to the sum of the M(II) and iron(II) ions in the coprecipitate is the same as that in the resulting ferrite of the composition $M_xFe_{3-x}O_4$. Thus, the Fe(III)/(M(II)+Fe((II)) ratio remains constant during the reaction, and the ferrite formation reaction is therefore not a redox reaction. The ferrite powders obtained are extremely finely divided and, depending on the reaction conditions, possess particle diameters of about 50-200 Å; the BET specific surface areas of the pigments are from 70 to 300 m²/g. Because they are extremely finely divided, these pigments obtained in colloidal form are difficult to isolate by a filtration process. Moreover, washing the filter cake is very tedious. In addition, extremely hard masses are formed when the precipitated powders are dried. It is impossible to prepare readily dispersible ferrite powders from these hard masses by pulverizing them. Furthermore, the extremely finely divided magnetic pigments prepared by the neutralization process generally have a lower saturation magnetization than coarse-particled pigments of the same composition, which is a disadvantage. This is a consequence of the large non-magnetic part of the pigment surface. Moreover, after they have been subjected to oxidation in the dry state with an oxygen-containing gas at, for example, 300° C. to give ferrite powders of the composition $M_xFe_{3-x}O_{4.5-0.5x}$, the extremely finely divided ferrite pigments $M_xFe_{3-x}O_4$ prepared by the neutralization process exhibit sintering of the extremely fine particles which is detectable from a sharp decrease in the BET specific surface area. This sintering results in a further deterioration in the dispersibility. Another consequence of the extremely finely divided nature of the ferrite powders prepared in this manner is that in general they cannot be compressed homogeneously during cold-pressing or hot-pressing, a ferrite ceramic which has an undesirably high porosity being obtained.

In the second process, the oxidation process, the starting material used is a coprecipitate prepared by combining an aqueous alkali metal hydroxide solution, an M(II) salt solution and an Fe(II) salt solution. The coprecipitate is heated, and oxidized with an oxidizing gas, in general air, until a ferrite powder which has the composition position $M_xFe_{3-x}O_4$[$=M(II)_xFe(III)_2O_4$], where $0 \leq x \leq 1$, and an isotropic particle $hape is obtained. In the oxidation process, an Fe(III)-free coprecipitate is used as a starting material, and some of the Fe(II) of the coprecipitate is oxidized to the Fe(III) in the resulting ferrite powder. During this procedure, the initial pH of the coprecipitate would be shifted to smaller values, ie. into the acidic range, if alkali metal hydroxide solution were not added constantly during the reaction. It has been disclosed (U.S. Pat. No. 3,822,210) that the fineness of the particles of the ferrite powders obtained by the oxidation process can be varied within a limited range by suitable choice of the reaction parameters, such as pH and reaction emperature. Moreover, under certain reaction conditions, the M(II) concentration x has an effect on the resulting fineness of the pigment particles. However, we have found that, using the oxidation process, it is extremely difficult to prepare M(II)-containing magnetite powders or M(II) ferrites having a particle diameter of less than 0.15 μm and a BET specific surface area greater than 12 m$^2$/g. When technical-grade iron(II) chloride solutions are used, particular problems are encountered as regards obtaining a very finely divided pigment. A particular disadvantage of the inadequate pigment particle fineness achievable by the oxidation process is that the resulting colored pigments possess poor transparency. Moreover, the achievable fineness of the pigment particles is insufficient to produce a stable magnetic liquid or ink. Moreover, in order to produce special highly permeable and low-noise ferrite ceramics, it is desirable to start from ferrite powders which are fairly finely divided.

It is an object of the present invention to provide a preparation process which makes it possible to obtain, in an economical manner, isotropic $M_xFe_{3-x}O_4$ ferrites [$=M(II)_xFe(II)_{1-x}Fe(III)_2O_4$], where M is Mg, Mn, Co, Ni, Cu and/or Zn and $0 \leq x \leq 1$, which have a particle fineness which can be set to a defined value and which is larger than the extremely small particle size obtainable by the neutralization process and smaller than the comparatively coarse particle size obtainable by the oxidation process. It is a further object of the present invention to provide a preparation process which makes it possible to obtain, in an economical manner, isotropic $M_xFe_{3-x}O_{4.5-0.5x}$ ferrites [$=M(II)_x$-$Fe(III)_{3-x}O_{4.5-0.5x}$] where M is Mg, Mn, Co, Ni, Cu and/or Zn and $0 \leq x \leq 1$, which have a particle fineness which can be set to a defined value and essentially corresponds to that of the abovementioned $M_xFe_{3-x}O_4$ pigments.

We have found that this object is achieved, and that finely divided ferrite powders of the general formula $M_xFe_{3-x}O_4[=M(II)_xFe(II)_{1-x}Fe(III)_2O_4]$, where M is Mg, Mn, Co, Ni, Cu and/or Zn and $0 \leq x \leq 1$, having an essentially isotropic particle shape and the desired fine particle size, can be prepared if an oxygen-containing gas is passed into a coprecipitate prepared from an aqueous alkali metal hydroxide solution, an M(II) salt solution, an iron(II) salt solution and an iron(III) salt solution, the ratio of the iron(III) ions to the sum of the M(II) and Fe(II) ions in the initial coprecipitate being smaller than that in the resulting ferrite powder of the composition $M_xFe_{3-x}O_4$.

We have also found that finely divided ferrite powders of the general formula $M_xFe_{3-x}O_{4.5-0.5x}$ [$=M(II)_xFe(III)_{3-x}O_{4.5-0.5x}$], where M is Mg, Mn, Co, Ni, Cu and/or Zn and $0 \leq x \leq 1$, which essentially have an isotropic particle shape and the desired fine particle size, can be obtained if ferrite powders which have the composition $M_xFe_{3-x}O_4$, contain the same ions M, have the same limits for x, and are prepared by passing an oxygen-containing gas into a coprecipitate produced from an aqueous alkali metal hydroxide solution, an M(II) salt solution, an iron(II) salt solution and an iron(III) salt solution, the ratio of the iron(III) ions to the sum of the M(II) and Fe(II) ions in the initial coprecipitate being smaller than that in the resulting ferrite powder of the composition $M_xFe_{3-x}O_4$, are oxidized with an oxygen-containing gas at from 100° to 500° C.

The novel process for the preparation of ferrite powders of the general formula $M_xFe_{3-x}O_4$ differs from the neutralization processes in that, in contrast to the latter, the Fe(III)/(M(II)+Fe(II)) ratio in the starting coprecipitate does not correspond to that in the resulting ferrite powder. In the novel process, the said ratio in the starting coprecipitate is always smaller than that in the resulting ferrite powder of the composition $M_xFe_{3-x}O_4$, where $0 \leq x \leq 1$. Furthermore, the process according to the invention is associated with the chemical conversion of gaseous oxygen via a redox reaction, whereas the neutralization process is carried out under a protective gas and hence in the absence of oxidizing gases. Since the novel process gives pigments which are coarser-particled than those obtained by the neutralization process, no filtration and washing problems arise in the novel process, as are encountered in the neutralization process.

The novel process for the preparation of ferrite powders of the general formula $M_xFe_{3-x}O_4$ differs from the oxidation process in that the latter starts from a coprecipitate containing an alkali metal hydroxide, an M(II) salt and an Fe(II) salt but no Fe(III) salt, whereas the novel process is based on a coprecipitate containing an iron(III) salt. In carrying out the novel process, we have found, surprisingly, that the particle size of the resulting ferrite powder having the composition $M_xFe_{3-x}O_4$, where M is Mg, Mn, Co, Ni, Cu and/or Zn and $0 \leq x \leq 1$, and hence also the particle size of the ferrite obtained by oxidation in the dry state, having the composition $M_xFe_{3-x}O_{4.5-0.5x}$ and containing the same ions M and having the same limits for x, decreases as the amount of Fe(III) in the coprecipitate increases. As the amount of Fe(III) in the coprecipitate increases, the particle diameter decreases from about 0.15 μm to about 0.02 μm. The corresponding pigments have BET specific surface areas of from about 12 to about 100 m$^2$/g. Thus, using the process according to the invention, it is possible to prepare substantially more finely divided pigments than can be prepared by the oxidation process. On the other hand, the novel process permits the preparation of pigments which are coarser-particled than those obtainable by the neutralization process.

For a given M/Fe ratio, the isotropic pigments prepared according to the invention, of the composition $M_xFe_{3-x}O_4$ and $M_xFe_{3-x}O_{4.5-0.5x}$, where M is Mg, Mn, Co, Ni, Cu and/or Zn and $0 \leq x \leq 1$, surprisingly possess substantially better dispersibility, better ferrimagnetic properties, in particular a fairly high saturation magnetization, and better compressibility during cold-pressing or hot-pressing than the known isotropic ferrites obtained by the neutralization process. The pigments prepared according to the invention differ from the known ferrite powders obtained by the oxidation process, having more finely divided particles and a narrower particle size distribution. These improvements in the ferrite powder are also very clearly noticeable when it is used as a transparent colored pigment, for the preparation of magnetic liquids and inks and for the preparation of highly permeable magnetically soft ferrite ceramics, and is also noticeable when the pigment is used for the preparation of plastic-bound ferrites, ie. plastoferrites.

The Examples which follow illustrate the invention. Examples 1 and 5 illustrate the preparation of zinc-containing iron oxides by the conventional oxidation process. Examples 4 and 8 illustrate the preparation of zinc-containing iron oxides by the conventional neutralization process. Examples 2, 3, 6 and 7 illustrate the preparation of zinc-containing iron oxides by the process according to the invention.

EXAMPLE 1

In a 5 liter stirred vessel, a solution of 27.26 g of $ZnCl_2$ in 2 liters of $H_2O$ was mixed with 1,057 ml of a technical-grade iron(II) chloride solution having a concentration of 33.59 g/100 ml of $FeCl_2$, while stirring and passing in 200 liters/hour of pure nitrogen. Aqueous NaOH solution and $H_2O$ were added to the resulting solution until the pH was 7.5 and the total volume was .4 liters. Thereafter, the coprecipitate was heated to 90° C., after which the stream of nitrogen was discontinued and, instead, 200 liters/hour of air were passed into the coprecipitate. The pH of the reaction mixture was kept constant at the set value of 7.5 by continuously adding a 2.5 molar sodium hydroxide solution. Air was passed in until the Fe(II) content of the reaction mixture remained constant. The reaction time was about 5 hours. The dispersion was cooled, and the resulting ferrite powder was then filtered off, washed and dried.

The following pigment properties were measured on the resulting isotropic zinc-containing iron oxide having the composition $Zn_{0.2}Fe_{2.8}O_4$: $H_c=11$ kA/m, $M_r/\rho=17 nTm^3/g$, $M_s/\rho=99$ $ntm^3/g$, $S_{N_2}$ (BET specific surface area) = 12 m²/g.

The resulting zinc-containing magnetite having the composition stated above was then oxidized with 200 liters/hour of air for 1 hour at 300° C. in a rotating quartz flask. The following pigment properties were measured on the resulting isotropic zinc-containing iron(III) oxide having the composition $Zn_{0.2}Fe_{2.8}O_{4.4}$: $H_c=9$ kA/m, $M_r/\rho=23$ $ntm^3/g$, $M_s/\rho=90$ $nTm^3/g$, $S_{N_2}$ (BET specific surface area) = 11.5 m²/g.

EXAMPLE 2

In a 5 liter stirred vessel, a solution of 27.26 g of $ZnCl_2$ was mixed with 553.8 ml of a technical-grade iron(II) chloride solution having a concentration of 41.20 g/100 ml of $FeCl_2$ and with 283.7 ml of a technical-grade iron(III) chloride solution having a concentration of 57.18 g/100 ml of $FeCl_3$, while stirring and passing in 200 liters/hour of pure nitrogen. The resulting solution was further treated as described in Example 1. The reaction time was about 4 hours.

The following pigment properties were measured on the resulting isotropic zinc-containing magnetite having the composition $Zn_{0.2}Fe_{2.8}O_4$: $H_c=9$ kA/m, $M_r/\rho=28$ $nTm^3/g$, $M_s/\rho=106$ nTm surface area) = 20.3 m²/g.

The zinc-containing iron(III) oxide of the composition $Zn_{0.2}Fe_{2.8}O_{4.4}$ obtained after the subsequent oxidation in the dry state carried out as described in Example 1 had the following pigment properties: $H_c=8$ kA/m, $M_r/\rho=24$ $nTm^3/g$, $M_s/\rho=81$ $nTm^3/g$, $S_{N_2}$ (BET specific surface area) = 19.2 m²/g.

EXAMPLE 3

In a 5 liter stirred vessel, a solution of 27.26 g of $ZnCl_2$ was mixed with 430.7 ml of a technical-grade iron(II) chloride solution having a concentration of 41.20 g/100 ml of $FeCl_2$ and with 397.2 ml of a technical-grade iron(III) chloride solution having a concentration of 57.18 g/100 ml of $FeCl_3$, while stirring and passing in 200 liters/hour of pure nitrogen. The resulting solution was further treated as described in Example 1. The reaction time was about 2 hours.

The following pigment properties were measured on the resulting isotropic zinc-containing magnetite having the composition $Zn_{0.2}Fe_{2.8}O_4$: $H_c=1$ kA/m, $M_r//\rho=5$ $nTm^3/g$, $M_s/\rho=78$ $nTm^3/g$, $S_{N_2}$ (BET specific) surface area) = 56.7 m²/g.

The zinc-containing iron(III) oxide of the composition $Zn_{0.2}Fe_{2.8}O_{4.4}$ obtained after the subsequent oxidation in the dry state carried out as described in Example 1 had the following pigment properties: $H_c=0$ kA/m, $M_r/\rho=6$ $nTm^3/g$, $M_s/\rho=66$ $nTm^3/g$, $S_{N_2}$ (BET specific surface area) = 53.8 m²/g.

EXAMPLE 4

In a 5 liter stirred vessel, a solution of 27.26 g of $ZnCl_2$ was mixed with 252.80 ml of a technical-grade iron(II) chloride solution having a concentration of 40.12 g/100 ml of $FeCl_2$ and with 567.38 ml of a technical-grade iron(III) chloride solution having a concentration of 57.18 g/100 ml of $FeCl_3$, while stirring and passing in 200 liters/hour of pure nitrogen. Aqueous NaOH solution and $H_2O$ were added to the resulting solution until the pH was 7.5 and the total volume was 4 liters. Thereafter, the coprecipitate was heated to 90° C. After a reaction time of 1 hour, the dispersion was cooled and the ferrite product obtained was filtered off, washed and dried.

The following pigment properties were measured on the resulting isotropic zinc-containing magnetite having the composition $Zn_{0.2}Fe_{2.8}O_4$: $H_c=1$ kA/m, $M_r/\rho 3$ $nTm^3/g$, $M_s/\rho=69$ $nTm^3/g$, $S_{N_2}$ (BET specific surface area) = 77.5 m²/g.

The zinc-containing iron(III) oxide of the composition $Zn_{0.2}Fe_{2.8}O_{4.4}$ obtained after the subsequent oxidation in the dry state carried out as described in Example 1 had the following pigment properties: $H_c=0$ kA/m, $M_r/\rho=2$ $nTm^3/g$, $M_r/\rho=56$ n $^{Tm^3}/g$, $S_{N_2}$ (BET specific surface area) = 72.9 m²/g.

EXAMPLE 5

In a 5 liter stirred vessel, a solution of 54.52 g of $ZnCl_2$ was mixed with 842.12 ml of a technical-grade iron(II) chloride solution having a concentration of 39.14 g/100 ml of $FeCl_2$, while stirring and passing in 200 liters/hour of pure nitrogen. The resulting solution was further treated as described in Example 1. The reaction time was about 5 hours.

The following pigment properties were measured on the resulting isotropic zinc-containing magnetite having the composition $Zn_{0.4}Fe_{2.6}O_4$: $H_c=10$ kA/m, $M_r/13$ $nTm^3/g$, $M_s/\rho=110$ $nTm^3/g$, $S_{N_2}$ (BET specific surface area) = 12.1 m2/g.

The zinc-containing iron(III) oxide of the composition $Zn_{0.4}Fe_{2.6}O_{4.3}$ obtained after the subsequent oxidation in the dry state carried out as described in Example 1 had the following pigment properties: $H_c=6$ kA/m, $M_r/\rho=16$ $nTm^3/g$, $M_s/\rho=84$ $nTm^3/g$, $S_{N_2}$ (BET specific surface area) = 10.8 m²/g.

EXAMPLE 6

In a 5 liter stirred vessel, a solution of 54.52 g of $ZnCl_2$ was mixed with 647.8 ml of a technical-grade iron(II) chloride solution having a concentration of 39.14 g/100 ml of $FeCl_2$ and with 170.21 ml of a technical-grade iron(III) chloride solution having a concentration of 57.18 g/100 ml of $FeCl_3$, while stirring and passing in 200 liters/hour of pure nitrogen. The resulting solution was further treated as described in Example 1. The reaction time was about 4 hours.

The following pigment properties were measured on the resulting isotropic zinc-containing magnetite having the composition $Zn_{0.4}Fe_{2.6}O_4$: $H_c=8$ kA/m, $M_r/\rho=21$ nTm$^3$/g, $M_s/\rho=99$ nTm$^3$/g, $S_{N2}$ (BET specific surface area)=28.9 m$^2$/g.

The zinc-containing iron(III) oxide of the composition $Zn_{0.4}Fe_{2.6}O_{4.3}$ obtained after the subsequent oxidation in the dry state carried out as described in Example 1 had the following pigment properties: $H_c=6$ kA/m, $M_r/\rho 20$ nTm$^3$/g, $M_s/\rho=82$ nTm$^3$/g, $S_{N2}$ (BET specific surface area)=26.8 m$^2$/g.

EXAMPLE 7

In a 5 liter stirred vessel, a solution of 54.52 g of $ZnCl_2$ was mixed with 518.22 ml of a technical-grade iron(II) chloride solution having a concentration of 39.14 g/100 ml of $FeCl_2$ and with 283.69 ml of a technical-grade iron(III) chloride solution having a concentration of 57.18 g/100 ml of $FeCl_3$, while stirring and passing in 200 liters/hour of pure nitrogen. The resulting solution was further treated as described in Example 1. The reaction time was about 3 hours.

The following pigment properties were measured on the resulting isotropic zinc-containing magnetite having the composition $Zn_{0.4}Fe_{2.6}O_4$: $H_c=3$ kA/m, $M_r/\rho=10$ nTm$^3$/g, $M_s/\rho=85$ nTm$^3$/g, $S_{N2}$ (BET specific surface area)=49.1 m$^2$/g.

The zinc-containing iron(III) oxide o the composition $Zn_{0.4}Fe_{2.6}O_{4.3}$ obtained after the subsequent oxidation in the dry state carried out as described in Example 1 had the following pigment properties: $H_c=0$ kA/m, $M_r/\rho=6$ nTm$^3$/g, $M_s/\rho 66$ nTm$^3$/g, $S_{N2}$ (BET specific surface area)=46.0 m$^2$/g.

EXAMPLE 8

In a 5 liter stirred vessel, a solution of 54.52 g of $ZnCl_2$ was mixed with 194.33 ml of a technical-grade iron(II) chloride solution having a concentration of 39.14 g/100 ml of $FeCl_2$ and with 567.37 ml of a technical-grade iron(III) chloride solution having a concentration of 57.18 g/100 ml of $FeCl_3$, while stirring and passing in 200 liters/hour of pure nitrogen. The resulting solution was further treated as described in Example 4.

The following pigment properties were measured on the resulting isotropic zinc-containing magnetite having the composition $Zn_{0.4}Fe_{2.6}O_4$: $H_c=0$ kA/m, $M_r/\rho=1$ nTM$^3$/g, $M_s/\rho 63$ nTm$^3$/g, $S_{N2}$ (BET specific surface area)=80.8 m$^2$/g.

The zinc-containing iron(III) oxide of the composition $Zn_{0.4}Fe_{2.6}O_{4.3}$ obtained after the subsequent oxidation in the dry state carried out as described in Example 1 had the following pigment properties: $H_c=0$ kA/m, $M_r/\rho=$ nTm$^3$/g, $M_s/\rho=54$ nTm$^3$/g, $S_{N2}$ (BET specific surface area)=73.4 m$^2$/g.

I claim:

1. A process for the preparation of a finely divided ferrite powder which has the spinel structure, is of the formula $$M(II)_xFe(III)_{1-x}Fe(III)_2O_4$$

where M is Mg, Mn, Co, Ni, Cu and/or Zn and x is from 0 to 1, and has an essentially isotropic particle shape, wherein an oxygen-containing gas is passed into a coprecipitate prepared from an aqueous alkali metal hydroxide solution, an M(II) salt solution, an iron(II) salt solution and an iron(III) salt solution, the ratio of the iron(III) ions to the sum of the M(II) and Fe(II) ions in the coprecipitate being smaller than that in the resulting ferrite powder of the composition $M_xFe_{3-x}O_4$.

2. A process for the preparation of a finely divided ferrite powder which has the spinel structure, is of the formula $M(II)_xFe(III)_{3-x}O_{4.5-0.5x}$, where M is Mg, Mn, Co, Ni, Cu and/or Zn and x is from 0 to 1, and has an essentially isotropic particle shape, wherein the ferrite powder repared as described in claim 1 and of the formula $M_xFe_{3-x}O_4$ is oxidized in the dry state at 100°–500° C. with an oxygen-containing gas.

3. A process as claimed in claim 1, wherein the oxygen-containing gas passed into the coprecipitate is air.

4. A process as claimed in claim 2, wherein the oxygen-containing gas used for the oxidation in the dry state at 100°–500° C. is air.

* * * * *

UNITED STATES PATENT AND TRADEMARK OFFICE
CERTIFICATE OF CORRECTION

PATENT NO. : 4,680,130
DATED : July 14, 1987
INVENTOR(S) : Hartmut HIBST

It is certified that error appears in the above-identified patent and that said Letters Patent is hereby corrected as shown below:

Column 8, line 35

[repared] should be:

prepared

Column 8, line 19 formula should read:

$M(II)_x Fe(II)_{1-x} Fe(III)_2 O_4$

Signed and Sealed this

Third Day of November, 1987

Attest:

DONALD J. QUIGG

Attesting Officer     Commissioner of Patents and Trademarks